(12) United States Patent
Jarvelin

(10) Patent No.: US 8,146,939 B2
(45) Date of Patent: Apr. 3, 2012

(54) ROLL-STABILIZING FIFTH WHEEL APPARATUS

(75) Inventor: Michael Jarvelin, Vancouver, WA (US)

(73) Assignee: Silver Eagle Manufacturing Company, Portland, OR (US)

( * ) Notice: Subject to any disclaimer, the term of this patent is extended or adjusted under 35 U.S.C. 154(b) by 3 days.

(21) Appl. No.: 12/598,025

(22) PCT Filed: Apr. 30, 2008

(86) PCT No.: PCT/US2008/062105
§ 371 (c)(1),
(2), (4) Date: Oct. 28, 2009

(87) PCT Pub. No.: WO2008/134756
PCT Pub. Date: Nov. 6, 2008

(65) Prior Publication Data
US 2010/0133780 A1    Jun. 3, 2010

Related U.S. Application Data

(60) Provisional application No. 60/915,081, filed on Apr. 30, 2007.

(51) Int. Cl.
*B62D 53/08* (2006.01)
(52) U.S. Cl. ............ 280/439; 280/441.1; 280/432
(58) Field of Classification Search ........... 280/438.1, 280/439, 440, 441.1, 432
See application file for complete search history.

(56) References Cited

U.S. PATENT DOCUMENTS

| | | | |
|---|---|---|---|
| 3,380,758 A | 4/1968 | Granning | |
| 3,717,273 A | 2/1973 | Berends | |
| 5,005,851 A | 4/1991 | McGhie et al. | |
| 5,226,675 A * | 7/1993 | Noah et al. | 280/439 |
| 5,639,106 A | 6/1997 | Vitale et al. | |
| 5,711,541 A | 1/1998 | Middlin et al. | |
| 5,785,341 A | 7/1998 | Fenton | |
| 5,882,028 A | 3/1999 | Osada | |
| 6,170,849 B1 * | 1/2001 | McCall | 280/433 |
| 6,581,951 B2 | 6/2003 | Lange | |
| 6,644,678 B2 * | 11/2003 | Strutt et al. | 280/438.1 |
| 6,726,396 B2 | 4/2004 | Plett | |
| 6,746,037 B1 | 6/2004 | Kaplenski et al. | |
| 7,380,810 B1 * | 6/2008 | Wilkens et al. | 280/439 |

(Continued)

OTHER PUBLICATIONS

Air Safe Hitches, http://www.airsafehitches.com, visited Mar. 26, 2008, 3 pp.

(Continued)

*Primary Examiner* — Kevin Hurley
(74) *Attorney, Agent, or Firm* — Stoel Rives LLP

(57) ABSTRACT

A fifth wheel apparatus for detachably coupling a trailing vehicle to a towing vehicle is disclosed. An equalizer bridge is supported on a towing vehicle and is pivotable about a roll axis that extends in a direction of towing motion. The equalizer bridge includes first and second arms that extend laterally from respective first and second sides of the roll axis. A fifth wheel head is coupled to the equalizer bridge for movement therewith about the roll axis. The fifth wheel head is pivotable relative to the equalizer bridge about a pitch axis transverse to the roll axis. First and second damping elements are operably interposed between the towing vehicle and the first and second arms, respectively. When the trailing vehicle is attached to the fifth wheel head, the first and second damping elements resist rolling movement of the trailing vehicle about the roll axis during travel over uneven roads.

20 Claims, 3 Drawing Sheets

U.S. PATENT DOCUMENTS

| | | | |
|---|---|---|---|
| 7,552,937 B1 * | 6/2009 | Taylor | 280/439 |
| 2004/0021290 A1 | 2/2004 | Hicks et al. | |
| 2006/0163840 A1 | 7/2006 | Schwalbe | |
| 2007/0052204 A1 | 3/2007 | Kaplenski | |

OTHER PUBLICATIONS

Air Safe Hitches, http://www.airsafehitches.com/32k_fifth_wheel.html, visited Mar. 26, 2008, 2 pp.

Air Safe Hitches, http://vvww.airsafehitches.com/airbox.com, visited Mar. 26, 2008, 3 pp.

Air Safe Hitches, http://www.airsafehitches.com/receiver_hitches.html, visited Mar. 26, 2008, 6 pp.

Air Safe Hitches, http://www.airsafehitches.com/gooseneck_hitches.html, visited Mar. 26, 2008, 5 pp.

Air Safe Hitches, http://www.airsafehitches.com/the_advantage.html, visited Mar. 26, 2008, 2 pp.

Air Safe Hitches, http://www.airsafehitches.com/race_car_trailer.html, visited Mar. 26, 2008, 3 pp.

* cited by examiner

ROLL-STABILIZING FIFTH WHEEL APPARATUS

RELATED APPLICATIONS

This application is a national stage application under 35 U.S.C. §371 of International Application No. PCT/US2008/062105, filed Apr. 30, 2008, which claims the benefit under 35 U.S.C. §119(e) of U.S. Provisional Application No. 60/915,081, filed Apr. 30, 2007, which is incorporated herein by reference.

TECHNICAL FIELD

The field of the present disclosure relates to a fifth wheel apparatus for detachably coupling a trailing vehicle to a towing vehicle and a method of stabilizing roll movement of a trailing vehicle.

BACKGROUND INFORMATION

Fifth wheel assemblies for attaching a trailer to a towing vehicle are known in which a kingpin located on the front of the trailer is coupled to the fifth wheel assembly located on the back of the towing vehicle. The fifth wheel assembly allows the trailer to pivot about a yaw axis.

During travel over rough terrain (e.g., off-roads, uneven roads), however, the rough terrain may cause the trailer to roll from side to side, which can lead to unstable handling of the towing vehicle and the trailer. Rolling motion of the trailer is particularly problematic when the center of gravity of the trailer is high compared to the center of gravity of the towing vehicle. The inventor has recognized that known fifth wheel assemblies do not adequately address the problems associated with off-road towing or travel over uneven roads—i.e., known fifth wheel assemblies do not adequately control roll motion of an attached trailer. Therefore, a need exists for an improved fifth wheel assembly that controls roll motion of a trailer, which may improve handling in off-road driving conditions or during travel over uneven roads. A need also exists for an improved fifth wheel assembly for towing trailers with high centers of gravity.

SUMMARY OF THE DISCLOSURE

The preferred embodiments disclose a fifth wheel apparatus for detachably coupling a trailing vehicle to a towing vehicle. The fifth wheel apparatus includes an equalizer bridge adapted to be supported on a towing vehicle. The equalizer bridge is pivotable about a roll axis that extends in a direction of towing motion, and the equalizer bridge includes first and second arms that extend laterally from respective first and second sides of the roll axis. The fifth wheel apparatus includes a fifth wheel head coupled to the equalizer bridge for movement therewith about the roll axis. The fifth wheel head is pivotable relative to the equalizer bridge about a pitch axis transverse to the roll axis. The fifth wheel apparatus includes first and second damping elements operably interposed between the towing vehicle and distal end regions of, respectively, the first and second arms. When a trailing vehicle is attached to the fifth wheel head, the first and second damping elements resist rolling movement of the trailing vehicle about the roll axis during travel over uneven roads.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
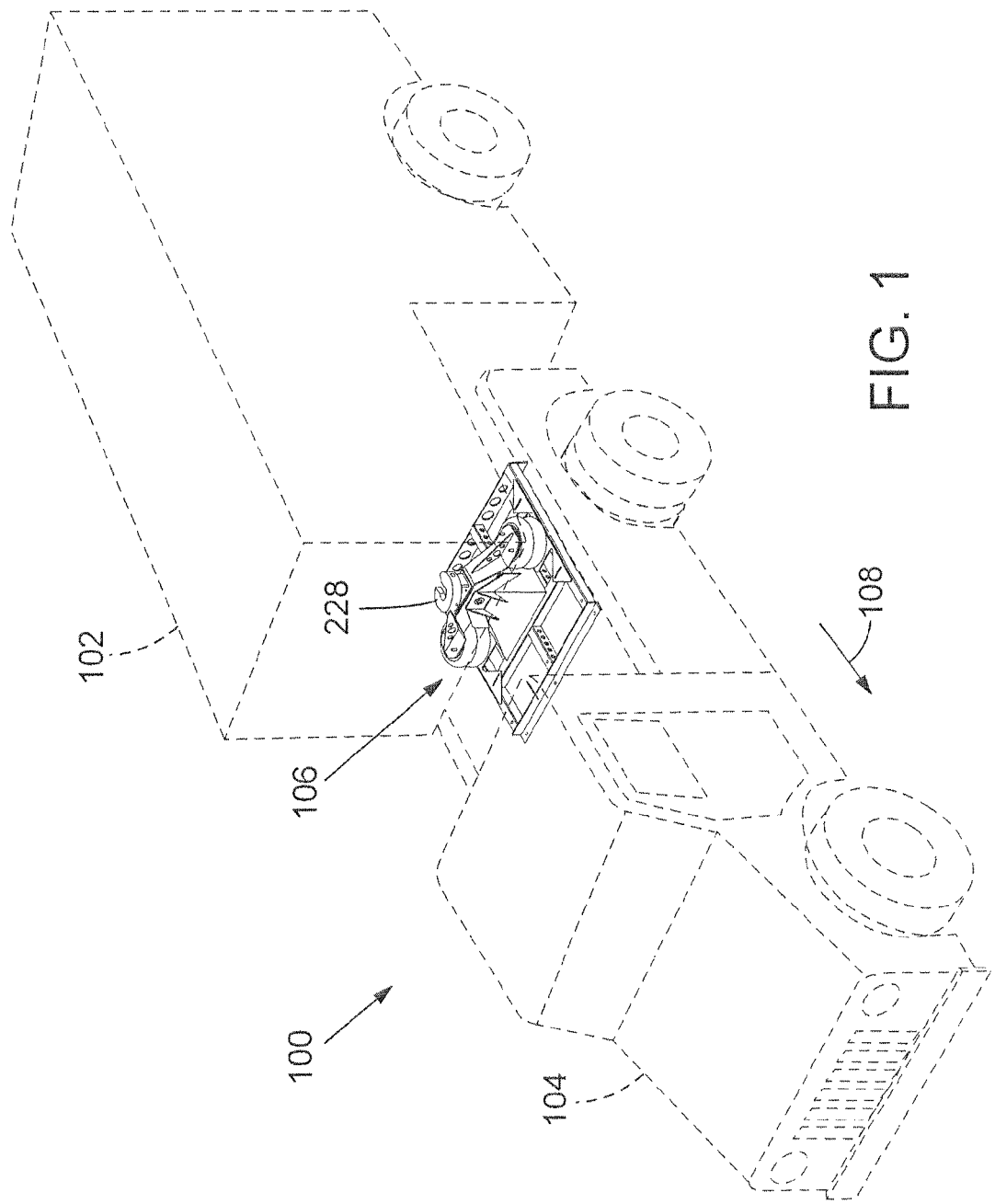
FIG. 1 depicts an articulated vehicle according to a preferred embodiment.

FIG. 1 depicts an articulated vehicle 100 that includes a trailing vehicle 102 detachably coupled to a towing vehicle 104 via a connector apparatus 106 (e.g., a fifth wheel apparatus) supported on a mounting surface (e.g., a truck bed) of towing vehicle 104. Towing vehicle 104 may be any type of towing vehicle known to skilled persons including, for example, a truck, pick-up, tractor, prime mover, trailer dolly, or the like. Trailing vehicle 102 may be any type of trailer that implements fifth wheel coupling. Although not required, trailing vehicle 102 may have a center of gravity higher than the center of gravity of towing vehicle 104. Trailing vehicle 102 includes a kingpin 102' (shown in FIG. 3), located on a front end of trailing vehicle 102, that is coupled to connector apparatus 106.

During operation in off-road conditions or over uneven roads, pot holes or other rough terrain (i.e., frost heaves, rail road tracks, rocks, boulders, uneven surfaces, and the like) may cause trailing vehicle 102 and towing vehicle 104 to shift relative to one another. For example, a pot hole or boulder may generate a rolling/overturning movement for trailing vehicle 102. Connector apparatus 106 allows trailing vehicle 102 and towing vehicle 104 to pivot relative to one another about roll, pitch, and yaw axes. In particular, connector apparatus 106 provides a substantial range of motion about the roll axis and allows the rolling movement of trailing vehicle 102 to be counteracted so that articulated vehicle 100 as a whole can be more stable during travel over rough terrain.

FIGS. 2-5 depict various views of an embodiment of connector apparatus 106. Connector apparatus 106 includes a frame 202 that is supported on or forms part of towing vehicle 104. As shown, frame 202 may be a pallet structure, including longitudinal support beams 204 and cross-support beams 206. Frame 202 is not limited to a pallet structure, but may include any structure or configuration that provides stability for connector apparatus 106 and trailing vehicle 102. Frame 202 may be configured to facilitate retrofitting connector apparatus 106 to a specific type of vehicle—for example, a high mobility multipurpose wheeled vehicle (i.e., a Humvee®).

Connector apparatus 106 includes a bridge pedestal 208 that is supported on and extends upward from frame 202. Preferably, bridge pedestal 208 is rigidly mounted to frame 202. Alternatively, frame 202 may be eliminated and bridge pedestal 208 can be mounted directly to towing vehicle 104. Bridge pedestal 208 may be pyramid-shaped (as shown) for stability and may be formed of pieces of sheet metal welded together along their adjoining edges. Bridge pedestal 208 is not limited to the pyramid-shape depicted, but may include any shape that extends upward from frame 202 and towing vehicle 104. Bridge pedestal 208 includes forward and aft hinge plates 210 and 212 that extend upward from top portions of bridge pedestal 208. Connector apparatus 106 may include gussets 214 to provided structural support for forward and aft hinge plates 210 and 212.

Forward and aft hinge plates 210 and 212 provide a roll pivot mount for an equalizer bridge 216 that is interposed between forward and aft hinge plates 210 and 212. Equalizer bridge 216 is pivotably coupled to forward and aft hinge plates 210 and 212 by one or more roll pins 218 that establish a roll axis 220 extending in a direction of towing motion (represented by arrow 108 in FIG. 1). The location of roll axis 220 is fixed relative to towing vehicle 104. Bridge pedestal 208 and hinge plates 210, 212 may be sized and configured to position roll axis 220 approximately 30-40 centimeters (cm) above the mounting surface of towing vehicle 104. The coupling of equalizer bridge 216 to forward and aft hinge plates 210 and 212 via roll pins 218 allows equalizer bridge 216 to pivot about roll axis 220 in response to the rolling movement (represented by arrow 220' in FIG. 3) of trailing vehicle 102. Alternatively, instead of hinge plates 210 and 212 and roll pins 218, connector apparatus 106 may include any joint structure that allows equalizer bridge 216 to pivot about a roll axis, preferably fixed relative to towing vehicle 104.

Figure 2:
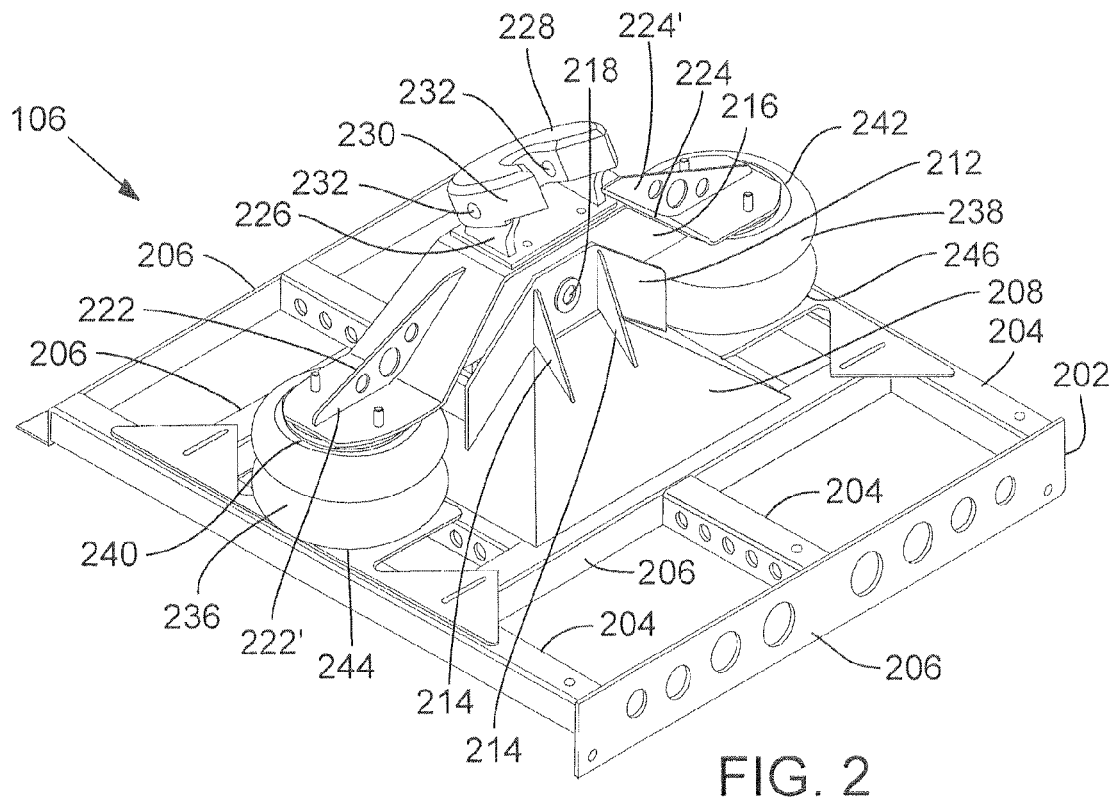
FIG. 2 is an isometric view of a connector apparatus according to a preferred embodiment.

Equalizer bridge 216 includes first and second arms 222 and 224 that extend laterally from first and second sides of roll axis 220. The length that each arm 222, 224 extends from roll axis 220 may be up to or less than one-half the width of the mounting surface of towing vehicle 104. For example, if the mounting surface of towing vehicle 104 has a width of approximately 2.1 meters (m), arms 222 and 224 may have a length of approximately 1.0 m or less, preferably ranging between about 0.5 m and 0.7 m. First and second arms 222 and 224 may include gussets 222' and 224' that provide structural support and rigidity to first and second arms 222 and 224. Although not required, first and second arms 222 and 224 may generally sweep downward from roll axis 220 as shown in FIGS. 1 and 2.

Connector apparatus 106 includes a pair of pitch hinge towers 226 supported on, and extending upward from, a center portion of equalizer bridge 216. Connector apparatus 106 also includes a fifth wheel head 228 having a downward-depending skirt 230 that overlaps with pitch hinge towers 226. Fifth wheel head 228 functions to receive kingpin 102' of trailing vehicle 102 and thereby couple trailing vehicle 102 to towing vehicle 104. A pair of pitch hinge pins 232 pivotably join fifth wheel head 228 to pitch hinge towers 226 to allow fifth wheel head 228 to pivot (represented by arrow 234' in FIG. 4) about a pitch axis 234 that is transverse to roll axis 220. In the embodiment shown, pitch axis 234 is located above roll axis 220. Other configurations may be possible, in which pitch axis 234 is located below roll axis 220 or at the same distance from frame 202 as roll axis 220. Equalizer bridge 216 serves as a rocker cradle for fifth wheel head 228 such that fifth wheel head 228 pivots with equalizer bridge 216 about roll axis 220.

First and second damping elements 236 and 238 are operably interposed between frame 202 and distal end regions of respectively, first arm 222 and second arm 224 of equalizer bridge 216. Damping elements 236 and 238 include first ends 240 and 242 joined, respectively, to the distal end regions of respective first arm 222 and second arm 224. Second ends 244 and 246 of damping elements 236 and 238—opposite respective first ends 240, 242 thereof—are joined to frame 202. Alternatively, if frame 202 is eliminated, second ends 244 and 246 can be joined directly to towing vehicle 104. Although two damping elements 236 and 238 are provided in the embodiment shown, articulated vehicle 100 may include more than one damping element on either side of roll axis 220. For example, two or more damping elements may be operably interposed between each arm 222, 224 and frame 202.

Damping elements 236 and 238 may implement any type of damping technology known to skilled persons, such as pneumatics and/or hydraulics. For example, damping elements 236 and 238 may be pneumatic isolators (e.g., cushioning air bags/bellows or air springs), viscous damping elements, automotive shock absorbers, and combinations thereof. Damping elements 236 and 238 may be combined with one or more resilient elements such as springs and elastic cushions, for example.

Fluid pressure adjustments may be made to change the stiffness and/or damping characteristics of damping elements 236 and 238, as desired, for example to accommodate different road conditions or other driving conditions. In the case of pneumatic isolators, any type of air bag or air spring may be used including, for example, a double convoluted air spring manufactured by Firestone®. Air pressure inside air chambers of damping elements 236 and 238 may be adjusted by a pump or other source of compressed air (to increase pressure) and a control valve (to decrease pressure). Articulated vehicle 100 may include a control system that allows for pressure adjustments while articulated vehicle 100 is moving. For example, towing vehicle 104 may include an on-board air compressor or pump (not shown) operably connected to damping elements 236 and 238, together with a control station located inside the cab of towing vehicle 104 to allow a driver to manually adjust the air pressures of damping elements 236 and 238. Also, towing vehicle 104 may include a sensor and control system that automatically adjusts pressures of damping elements 236 and 238 to compensate for changes in towing loads (e.g., center of gravity and gross vehicle weight) and/or driving conditions. For example, if the gross vehicle weight of a towing load is approximately, 3,175 kilograms (kg) (i.e., 7,000 pounds) the pressure of damping elements 236 and 238 might be approximately 241 kilopascals (kPa) (i.e., 35 pounds/inch$^2$). The towing load of trailing vehicle 102 may be greater or less than 3,175 kg and the pressure of damping elements 236 and 238 may be adjusted to be greater or less than 241 kPa. Damping elements 236 and 238 may be characterized by one or more various spring rates. For example, the spring rate of damping elements 236 and 238 with a pressure of approximately 241 kPa and a static height of 21.6 cm, may have a spring rate of approximately 113 newtons/millimeter (N/mm) (i.e., 650 pounds/inch). The spring rate may be adjusted to be greater or less than 113 N/mm.

In some situations, the damping characteristics of damping elements 236 and 238 will be preferably critically damped, or close to critically damped (within, e.g., 20% of critically damped) but not under-damped, to quickly stabilize, without oscillation, rolling movement of trailing vehicle 102—for example, when towing vehicle 104 is traveling transverse over relatively steep rugged terrain. During other driving conditions, damping elements 236 and 238 may be close to critically damped and slightly under-damped. Still, during other driving conditions, it may be beneficial to have an over-damped system so that much of the rotational energy of trailing vehicle 102 about roll axis 220 is transferred to towing vehicle 104. Damping elements 236 and 238 may be independent of one another in that their air chambers are not connected. Thus, pressures in the air chambers of damping elements 236 and 238 may be adjusted differentially, to laterally balance or level trailing vehicle 102.

During travel over uneven roads or rough terrain, uneven ground may induce rolling/angular momentum for trailing vehicle 102 about roll axis 220. The angular momentum of trailing vehicle 102 causes fifth wheel head 228 and equalizer bridge 216 to pivot about roll axis 220. The pivot motion of equalizer bridge 216 causes first and second arms 222, 224 to move relative to frame 202 and towing vehicle 104. For example, first arm 222 may move toward frame 202 along a first arc path and second arm 224 may move away from frame 202 along a second arc path. The absolute distances that first and second arms 222, 224 travel along respective first and second arc paths may be approximately equal.

Figure 3:
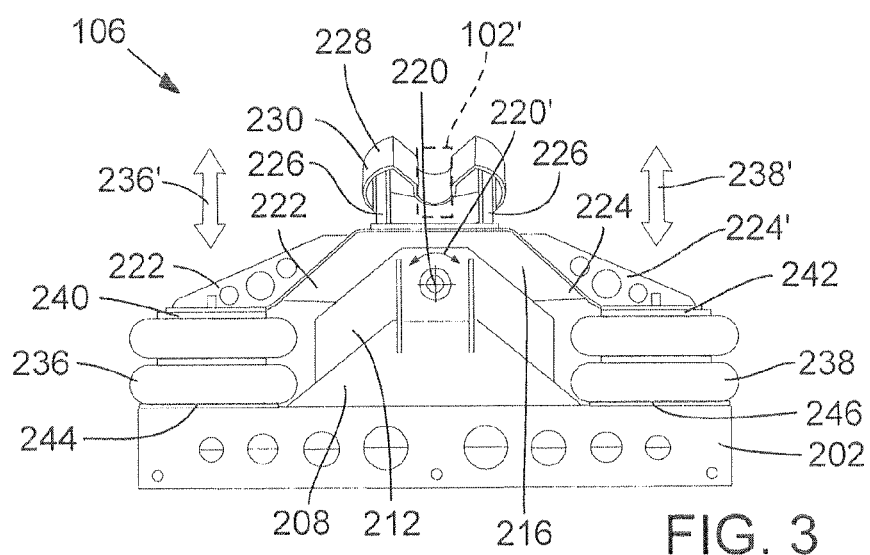
FIG. 3 is a rear elevation view of the connector apparatus of FIG. 1.
Figure 4:
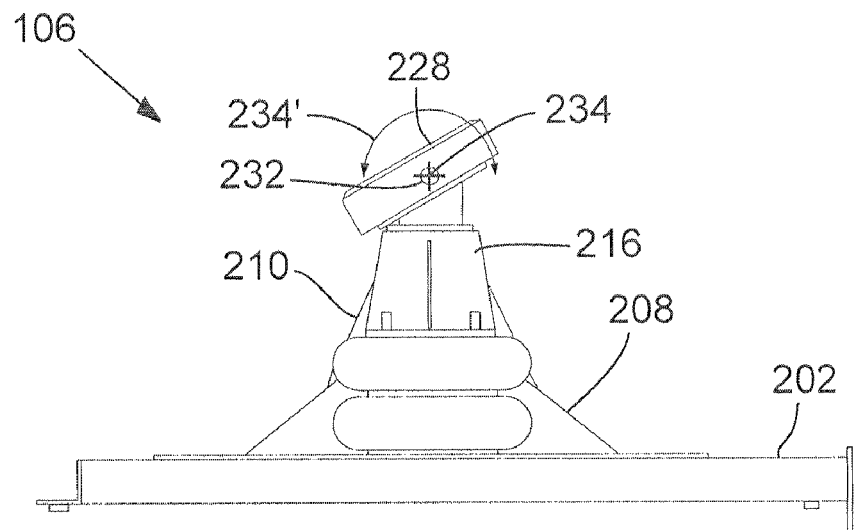
FIG. 4 is a left side elevation view of the connector apparatus of FIG. 1.
Figure 5:
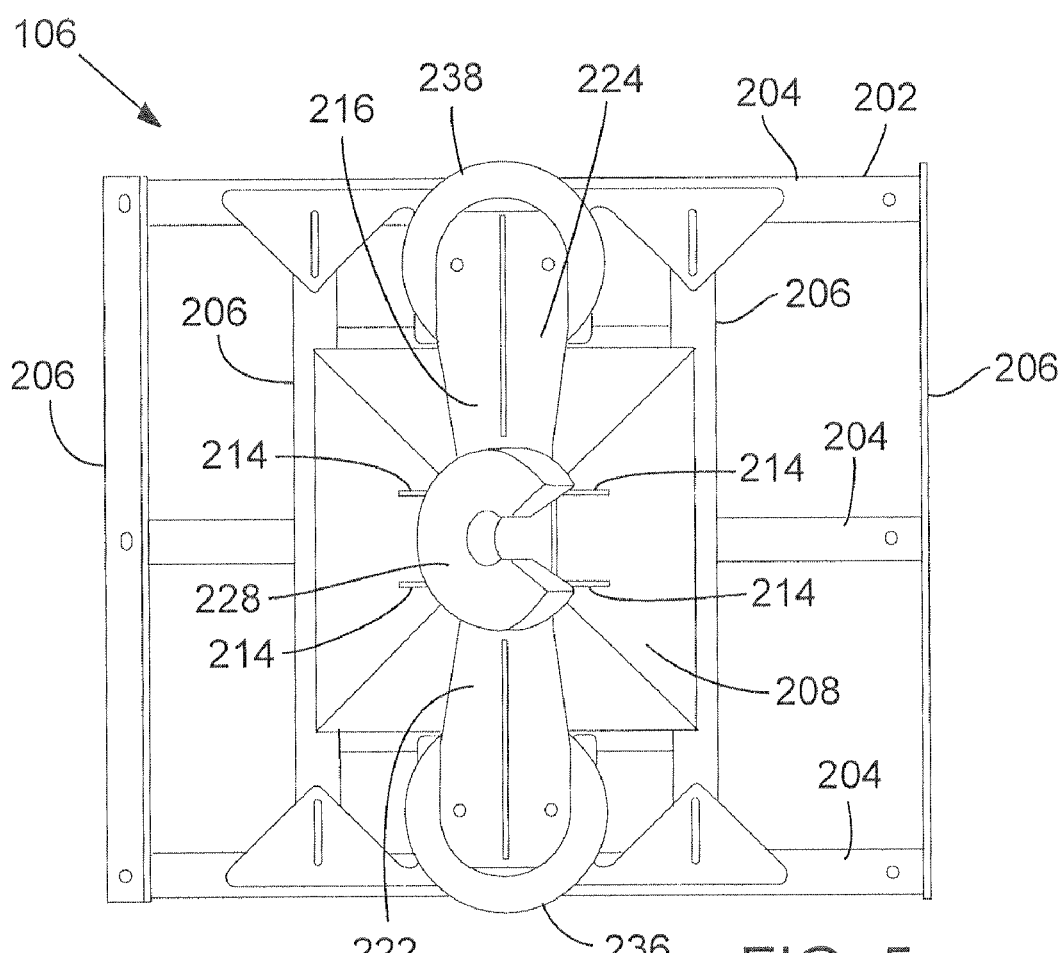
FIG. 5 is a top plan view of the connector apparatus of FIG. 1.

Because first and second damping elements 236 and 238 are interposed between and joined to frame 202 and respective first and second arms 222 and 224, first and second damping elements 236 and 238 compress and elongate in response to the pivot motion of equalizer bridge 216 and fifth wheel head 228. For example, as first arm 222 moves toward frame 202 and second arm 224 moves away from frame 202, first damping element 236 compresses and second damping element 238 elongates. Damping elements 236 and 238 absorb some of the rotational energy (i.e., kinetic energy) of the rolling movement of trailing vehicle 102. Damping elements 236 and 238 also resist being compressed to counteract the rolling movement of trailing vehicle 102. Damping elements 236 and 238 may function as progressive rate springs such that the spring rate increases as damping elements 236 and 238 become compressed. Damping elements 236 and 238 may also resist being elongated. FIG. 3 includes arrows 236' and 238' that represent roll-stabilizing force directions. Because roll axis 220 is fixed relative to towing vehicle 104, connector apparatus 106 may control rolling movement of trailing vehicle 102 and towing vehicle 104 more than a configuration without a fixed roll axis. For example, if equalizer bridge 216 were allowed to float (i.e., vertical movement constrained only by damping elements 236 and 238), it is possible that the frequency of the movement of trailing vehicle 102 could couple with the natural frequency of damping elements 236 and 238 resulting in an uncontrollable resonating event.

When damping elements 236 and 238 resist being compressed, an inertial moment of towing vehicle 104 opposes the rolling movement of trailing vehicle 102 and reduces the angular momentum of trailing vehicle 102. A significant component of the rotational energy of trailing vehicle 102 is transferred to and absorbed at towing vehicle 104 largely by damping elements 236, 238 and the suspension of towing vehicle 104. Towing vehicle 104 may have a lower center of gravity than trailing vehicle 102 such that transferring a component of the rotational energy of trailing vehicle 102 to towing vehicle 104 makes articulated vehicle 100 as a whole more stable. As damping elements 236 and 238 resist rolling movement of trailing vehicle 102, damping elements 236,238 and towing vehicle 104 also apply restorative forces to trailing vehicle 102, via equalizer bridge 216, that return trailing vehicle 102 to an equilibrium (i.e., level) condition. For example, the inertial moment of towing vehicle 104 may cause trailing vehicle 102 to roll back to a level, or stable, state. Thus, because damping elements 236 and 238 allow trailing vehicle 102 to rotate somewhat about roll axis 220 while also providing resistance to the rolling movement of trailing vehicle 102, the ride of articulated vehicle 100 is made smoother and more stable during travel over rough terrain, even at high speeds.

Conversely, damping elements 236 and 238 also counteract rolling movement and absorb rotational energies of towing vehicle 104. For example, when towing vehicle 104 travels over rough terrain, rolling motion in towing vehicle 104 may be induced so that frame 202 moves closer to first arm 222 and further from second arm 224 of equalizer bridge 216. In response to the rolling movement of towing vehicle 104, first damping element 236 compresses and second damping element elongates 238 to absorb some of the rotational energy of towing vehicle 104. Also, first and second damping elements 236 and 238 resist being compressed and trailing vehicle 102 counteracts the rolling movement of towing vehicle 104. Damping elements 236 and 238 may also resist being elongated. Thus, because damping elements 236 and 238 allow and resist rolling movement of towing vehicle 104, the handling and ride of articulated vehicle 100 may be improved.

It will be obvious to those having skill in the art that many changes may be made to the details of the above-described embodiments without departing from the underlying principles of the invention. For example, connector apparatus 106 may include any structure and configuration where a roll axis is provided, together with damping elements to counteract the rolling movement of trailing vehicle 102. The scope of the present invention should, therefore, be determined only by the following claims.

The invention claimed is:

1. A fifth wheel apparatus for detachably coupling a trailing vehicle to a towing vehicle, comprising:
   an equalizer bridge supported on a towing vehicle and pivotable about a roll axis that extends in a direction of towing motion of the towing vehicle and that is vertically fixed relative to the towing vehicle, the equalizer bridge including first and second arms that extend laterally from respective first and second sides of the roll axis;
   a fifth wheel head attached to the equalizer bridge for movement therewith about the roll axis, the fifth wheel head pivotable relative to the equalizer bridge about a pitch axis transverse to the roll axis; and
   a first damping element operably interposed between the towing vehicle and a distal end region of the first arm and a second damping element operably interposed between the towing vehicle and a distal end region of the second arm, and when the trailing vehicle is attached to the fifth wheel head, the first and second damping elements resist rolling movement of the trailing vehicle about the roll axis during travel over uneven roads.

2. The fifth wheel apparatus of claim 1, further comprising a bridge pedestal supported on the towing vehicle, wherein the equalizer bridge is supported on the bridge pedestal.

3. The fifth wheel apparatus of claim 2, wherein the bridge pedestal is rigidly mounted to the towing vehicle and the fifth wheel apparatus further comprises forward and aft hinge plates that are rigidly mounted to the bridge pedestal, the forward and aft hinge plates configured to provide a roll pivot mount for the equalizer bridge.

4. The fifth wheel apparatus of claim 3, wherein the equalizer bridge is pivotably coupled to the forward and aft hinge plates via a roll pin that establishes the roll axis.

5. The fifth wheel apparatus of claim 1, wherein one of the first and second damping elements compresses and the other damping element elongates in response to the rolling movement of the trailing vehicle relative to the towing vehicle.

6. The fifth wheel apparatus of claim 5, wherein the compressed damping element resists being compressed to counteract the rolling movement of the trailing vehicle.

7. The fifth wheel apparatus of claim 1, further comprising a pair of pitch hinge towers mounted on the equalizer bridge, the pair of pitch hinge towers including a pair of pitch hinge pins for pivotably coupling the fifth wheel head to the pitch hinge towers, wherein the pitch hinge pins establish the pitch axis.

8. The fifth wheel apparatus of claim 1, wherein the first and second damping elements are pneumatic isolators.

9. A fifth wheel apparatus for detachably coupling a trailing vehicle to a towing vehicle, comprising:
   an equalizer bridge supported on a towing vehicle and pivotable about a roll axis that extends in a direction of towing motion of the towing vehicle, the equalizer bridge including first and second arms that extend laterally from respective first and second sides of the roll axis;
   a fifth wheel head attached to the equalizer bridge for movement therewith about the roll axis, the fifth wheel head pivotable relative to the equalizer bridge about a pitch axis transverse to the roll axis, wherein the first and second arms sweep downwardly from the fifth wheel head; and
   a first damping element operably interposed between the towing vehicle and a distal end region of the first arm and a second damping element operably interposed between the towing vehicle and a distal end region of the second arm, and when the trailing vehicle is attached to the fifth wheel head, the first and second damping elements resist rolling movement of the trailing vehicle about the roll axis during travel over uneven roads.

10. The fifth wheel apparatus of claim 9, wherein a location of the roll axis is fixed relative to the towing vehicle.

11. An articulated vehicle, comprising:
    a towing vehicle;
    a fifth wheel apparatus pivotably supported on the towing vehicle for rotation relative to the towing vehicle about a roll axis extending in a direction of towing motion of the towing vehicle and vertically fixed relative to the towing vehicle;
    a trailing vehicle detachably coupled to the towing vehicle via the fifth wheel apparatus, the fifth wheel apparatus pivoting relative to the towing vehicle about the roll axis in response to rolling movement of the trailing vehicle about the roll axis during travel over uneven roads; and
    a first damping element operably interposed between the towing vehicle and the fifth wheel apparatus on a first lateral side of the roll axis and a second damping element operably interposed between the towing vehicle and the fifth wheel apparatus on a second lateral side of the roll axis such that the rolling movement of the trailing vehicle about the roll axis causes one of the first and second damping elements to compress and the other to elongate, and wherein the compressed damping element resists being compressed to counteract the rolling movement of the trailing vehicle about the roll axis.

12. The articulated vehicle of claim 11, wherein the towing vehicle has a center of gravity lower than a center of gravity of the trailing vehicle.

13. The articulated vehicle of claim 12, wherein the first and second damping elements absorb a component of a rotational energy of the rolling movement of the trailing vehicle.

14. The articulated vehicle of claim 13, wherein the first and second damping elements transfer a component of the rotational energy to the towing vehicle to stabilize the trailing vehicle.

15. A method of counteracting rolling movement of a trailing vehicle that is detachably coupled to a towing vehicle via a fifth wheel apparatus, comprising:
    pivotably supporting the fifth wheel apparatus on the towing vehicle for rotation about a roll axis that extends in a direction of towing motion of the towing vehicle and that is vertically fixed relative to the towing vehicle;
    in response to road-induced roll movement of the trailing vehicle, resisting and damping rotation of the fifth wheel apparatus about the roll axis via first and second damping elements operably interposed between the fifth wheel apparatus and the towing vehicle on lateral sides of the roll axis to thereby counteract and stabilize the roll movement of the trailing vehicle.

16. The method of claim 15, further comprising:
    compressing the first damping element while simultaneously elongating the second damping element in response to the rolling movement of the trailing vehicle; and
    resisting compression of the first damping element to counteract the rolling movement of the trailing vehicle.

17. The method of claim 15, in which the towing vehicle has a center of gravity lower than the center of gravity of the trailing vehicle, and resisting rotation of the fifth wheel apparatus causes rotational energy of the trailing vehicle to be transferred to the towing vehicle.

18. The fifth wheel apparatus of claim 9, further comprising a bridge pedestal supported on the towing vehicle, wherein the equalizer bridge is supported on the bridge pedestal.

19. The fifth wheel apparatus of claim 18, wherein the bridge pedestal is rigidly mounted to the towing vehicle and the fifth wheel apparatus further comprises forward and aft hinge plates that are rigidly mounted to the bridge pedestal, the forward and aft hinge plates configured to provide a roll pivot mount for the equalizer bridge.

20. The fifth wheel apparatus of claim 19, wherein the equalizer bridge is pivotably coupled to the forward and aft hinge plates via a roll pin that establishes the roll axis.

* * * * *